United States Patent

Crockett

[11] Patent Number: 5,816,907
[45] Date of Patent: Oct. 6, 1998

[54] VEHICLE AIR OUTLET WITH COMBINED FLOW STRAIGHTENER AND SHUTOFF DOOR

[75] Inventor: Steven Crockett, Hampstead, Md.

[73] Assignee: Bowles Fluidics Corporation, Columbia, Md.

[21] Appl. No.: 897,421

[22] Filed: Jul. 21, 1997

Related U.S. Application Data

[63] Continuation-in-part of Ser. No. 810,105, Feb. 25, 1997, abandoned.

[51] Int. Cl.$^6$ ...................................................... B60H 1/34
[52] U.S. Cl. ............................................. 454/155; 454/322
[58] Field of Search ................................... 454/108, 109, 454/152, 154, 155, 318, 322, 333

[56] References Cited

U.S. PATENT DOCUMENTS

| | | | |
|---|---|---|---|
| 3,276,347 | 10/1966 | Atkinson et al. | 454/154 |
| 3,835,759 | 9/1974 | Lloyd | 454/154 |
| 5,297,989 | 3/1994 | Stouffer et al. | 454/155 |
| 5,356,336 | 10/1994 | Stouffer et al. | 454/155 |

FOREIGN PATENT DOCUMENTS

| | | | |
|---|---|---|---|
| 59-215533 | 12/1984 | Japan | 454/152 |

Primary Examiner—Harold Joyce
Attorney, Agent, or Firm—Jim Zegeer, Esq.

[57] ABSTRACT

A vehicle air outlet having an outlet bell, an upstream shutoff valve having an open and closed position, a directionality control member which is downstream of the shutoff valve. The upstream shutoff valve includes a flow straightener assembly rendered functional when the shutoff valve is in a fully opened position and non-functional when the shutoff valve is in a closed position. The shutoff valve is mounted on a rotary shaft in the air outlet, and the flow straightener is mounted on the same rotary shaft with the shutoff valve and is operated commonly on an operation of the rotary shaft.

6 Claims, 2 Drawing Sheets

VEHICLE AIR OUTLET WITH COMBINED FLOW STRAIGHTENER AND SHUTOFF DOOR

The present application is a continuation-in-part of application Ser. No. 08/810,105, filed Feb. 25, 1997 abandoned entitled VEHICLE AIR OUTLET WITH COMBINED FLOW STRAIGHTENER AND SHUTOFF DOOR.

The present invention relates to vehicle air outlets having a combined shutoff door or valve and flow conditioner or straightener.

BACKGROUND AND BRIEF DESCRIPTION OF THE INVENTION

Stouffer et al Patent Nos. 5,297,989 and 5,356,336 (incorporated herein by reference) disclose air outlets in which directionality of air flow exiting the outlet is controlled by an upstream intruder member in conjunction with downstream diverging sidewalls and a grille. The intruder member is mounted or formed with a manually manipulatable control shaft which is adjustably held in position by a ball and socket joint. Upstream of this assembly is shutoff butterfly valve or door of some sort which controls the flow of air to the air outlet. The present invention is concerned with the construction of this upstream air shutoff valve or door resulting in improvements in the performance of the intruder member or other directionality controlling device in controlling the directionality of air flow exiting the air outlet. Airflow straighteners are known in the art. See Stouffer et al Pat. No. 4,709,622.

The object of the invention is to provide a vehicle air outlet having a control device which has wide angulations in all directions, and which has an upstream valve control member which is combined with an integral straightener or flow conditioner which conditions non-uniform or unsteady flow to produce a more uniform flow which is beneficial in operation of, in the preferred embodiment, a the downstream directionality control member or device. The valve or butterfly valve or shutoff function is limited to shutoff of flow. Thus, the present invention combines the function of flow straightening vanes or a flow straightening grid and a shutoff valve. In the open position, the valve door is parallel with the general direction of flow in the duct upstream of the directionality controller, and the door along with several other vanes integral therewith become a flow straightener grid. Spherical grid configurations as well as other configurations are possible. When it is desired to stop the flow the door is pivoted to the closed position and blocks flow in the normal fashion.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
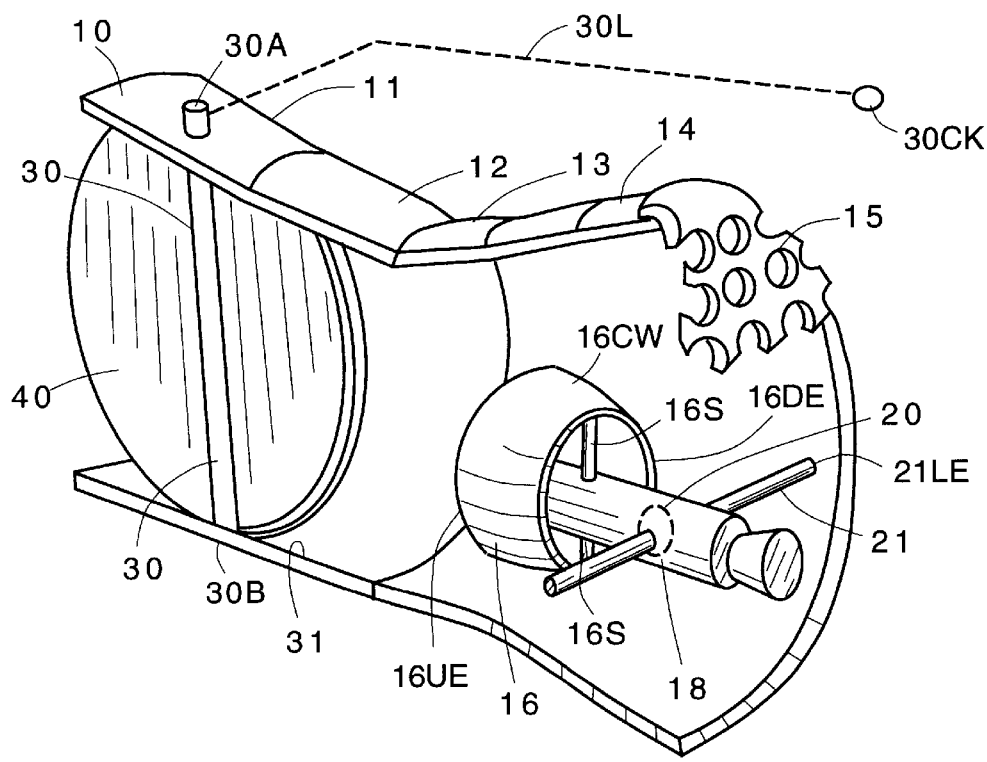
FIG. 1 (prior art) is a partially cut-away isometric perspective view of the vehicle air outlet showing the shutoff valve open, FIG. 2 (prior art) is a partially cut-away view of the vehicle air outlet assembly with the shutoff valve closed.
Figure 2:
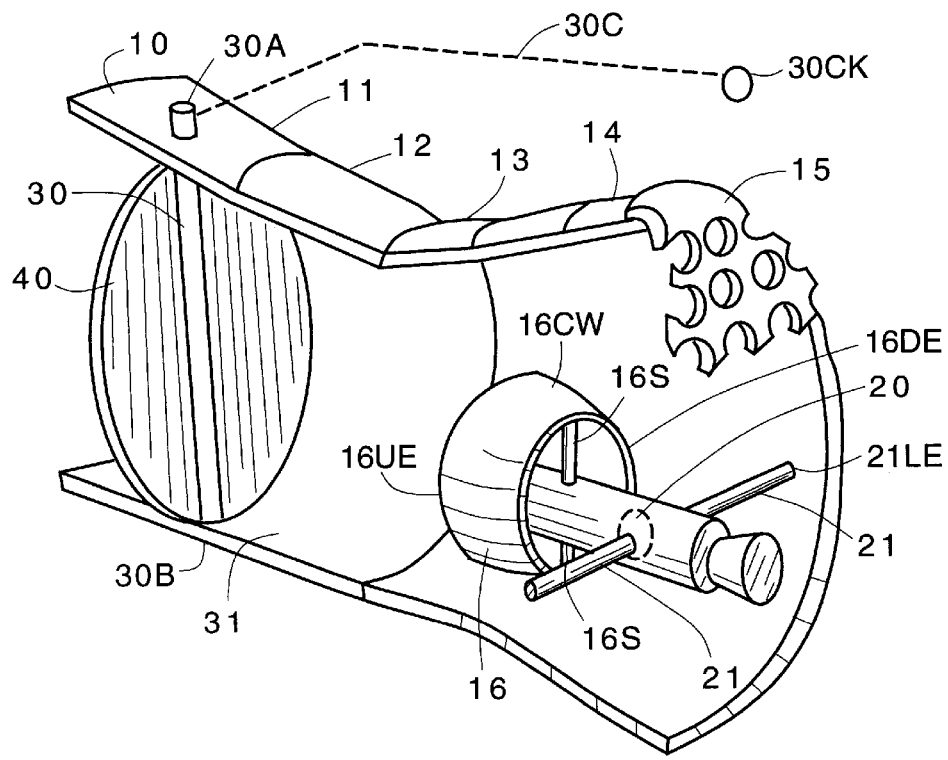

As stated above, the present invention is an improvement on the air outlet disclosed in Stouffer Patent Nos. 5,297,989 and 5,356,336. As shown in FIG. 1, a circular air duct 10 has a shut off valve section 11 which leads to a throat area 12 where it is connected to the upstream end 13 of the downstream diverging outlet bell 14 which in this embodiment is closed off by an outlet grille 15, preferably of the type disclosed in the above referenced Stouffer et al patents. However, other types of grilles can be used. In fact, there may be applications where no outlet grille or intruder type air directionality control member is required. Moreover, the duct can be rectangular or oval in shape.

Upstream intruder or air directionality controller 16, which in this embodiment is a frustrum of a cone having an upstream end 16 UE, and a downstream end 16 DE joined by converging walls 16 CW. Other forms of intruder directionality controllers are shown in the above-referenced Stouffer et al patents. It is unnecessary that the walls converge in a downstream direction. A control shaft 18 is secured to intruder 16 by support braces 16S. A ball 20 is secured to a support bar 21 which in turn has its lateral ends 21 LE fixedly secured to the perimeter of outlet bell 14.

The shutoff butterfly valve or door is upstream of the directionality controller. It includes a conventional circular (or oral or rectangular) plate member 40 which may be covered with foam so as to seal against the duct 31 wall surfaces and mounted on shaft 30 which is mounted for rotation in the walls 31 of duct 10. One or both protruding ends 30A and 30B can be coupled by a linkage 30L to a shutoff control knob 30CK which can be located adjacent the grille 15.

THE PRESENT INVENTION

Figure 3:
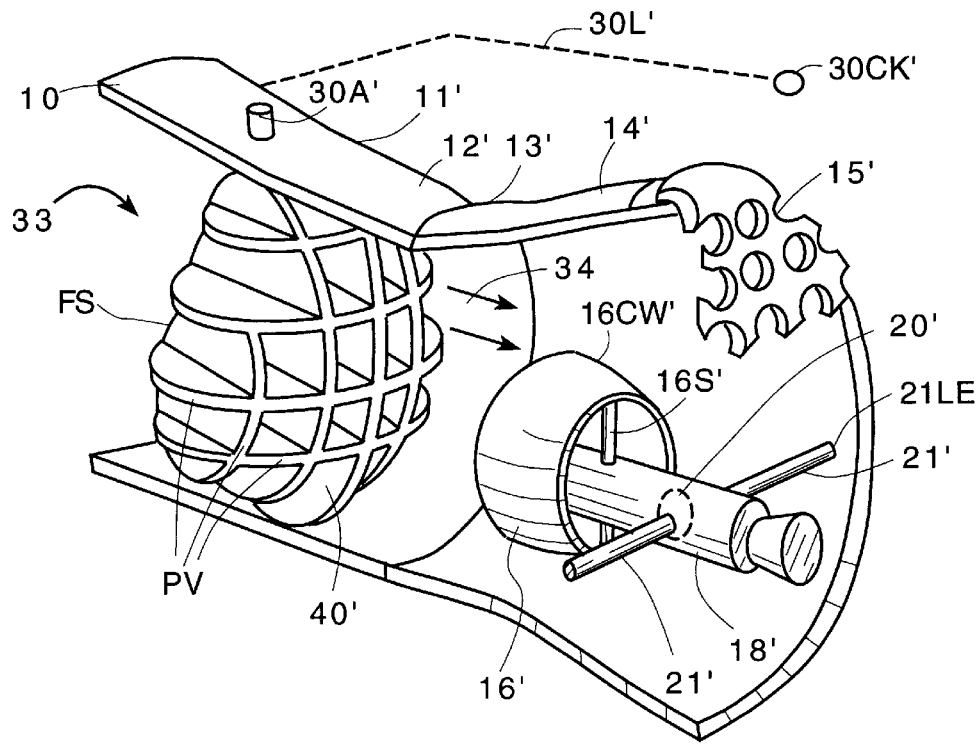
FIG. 3 is a partially cut-away view illustrating an air outlet with the shutoff door or valve open with the flow straightening frame assembly being introduced to render non-uniform flow more continuous and uniform and thus enhance functioning of the directionality controller.
Figure 4:
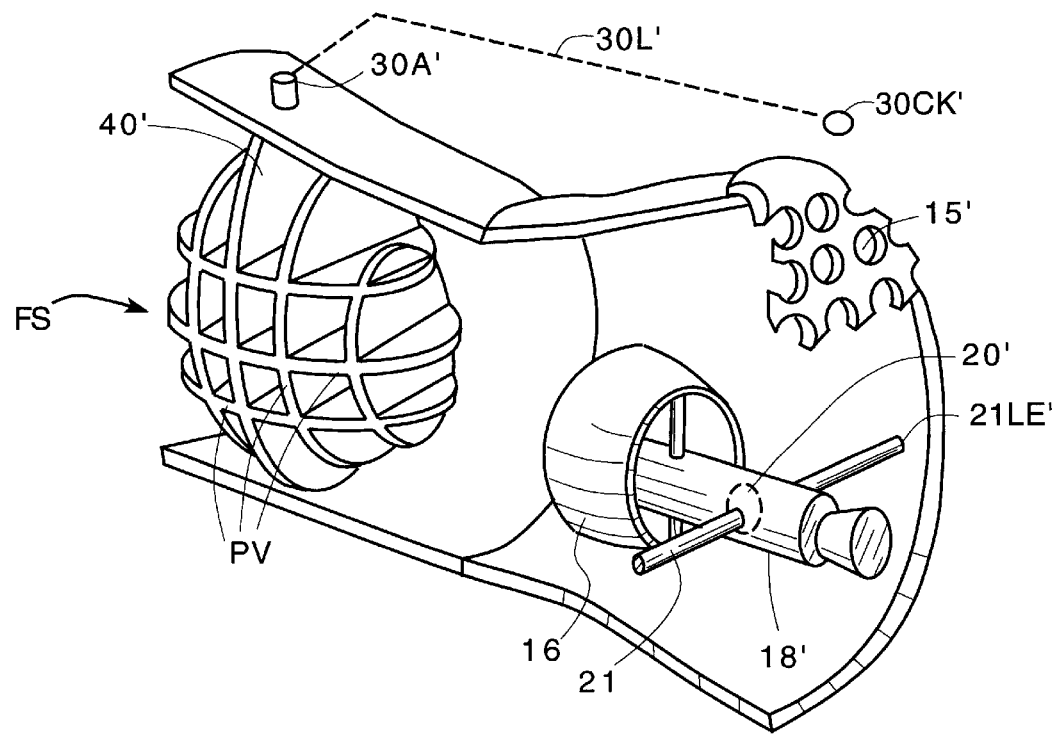
FIG. 4 is a partially cut-away view showing the shutoff door/valve closed.

Referring now to FIGS. 3 and 4 (primed numerals refer to corresponding components), the present invention incorporates a flow straightener frame or grid FS which is on the same rotary shaft 30' with the shutoff valve 40' and improves the performance of deflection controller or intruder 16 by reducing or eliminating non-uniform or unsteady flow so that the flow direction of air supplied to be directionally controlled by the intruder 16 is more uniform. As discussed above, shaft 30 is mounted for rotation in duct portion 31. As schematically illustrated, air flow in upstream duct portion 32 is non-uniform as indicated by the non-uniform flow 33 and is more uniform as it exits the flow straightener FS portion as indicated at 34 prior to the converging diverging outlet bell structure 14. As illustrated, the flow straightener in this embodiment is composed of a grid of cells defined by thin, vertical and horizontal partitions or vanes PV.

In the preferred embodiment, the door and flow straightener assembly 35 (shown in FIGS. 3 and 4) has only two positions, namely, a fully opened position where the flow straightener is in its axially aligned positioned for its air flow straightener function and a fully shut position where the butterfly valve 40' substantially blocks flow of air. As shown in FIG. 3, in the flow straightener position to perform the flow straightening function, the butterfly valve 40', which may be in the form of a foam covered plate is streamlined with the direction of air flow so as to provide minimum impedance and also functions as part of the flow straightener vane grid FS. It will be noted that inasmuch as the butterfly valve is streamlined with the direction of flow of air it also functions in part as the flow straightener in achieving that function. In this arrangement, the butterfly valve and the flow straightener FS are commonly mounted on rotary shaft 30' which rotary shaft 30' which is controlled from exterior of the grille by a linkage 30L' to a control member 30CK'.

While a preferred embodiment of the invention has been illustrated and described, it will be appreciated that other embodiments, adaptations and modifications of the invention will be readily apparent to those skilled in the art.

What is claimed is:

1. In a vehicle air outlet, an upstream shutoff valve having an open and closed position, a directionality control device downstream of said shutoff valve, and a manual control device connected to said directionality control member, the improvement comprising said upstream shutoff valve including a flow straightener assembly rendered functional when said shutoff valve is in a fully opened position and non-functional when said shutoff valve is in a closed position.

2. The air outlet defined in claim 1 wherein said shutoff valve is mounted on a rotary shaft in said air outlet, and wherein said flow straightener assembly is comprised of a grid of vanes mounted on said rotary shaft with said shutoff valve and is operated commonly on an operation of said rotary shaft.

3. In a vehicle air outlet having an outlet bell, an upstream shutoff valve having an open and closed position, an upstream directionality control device which is downstream of said shutoff valve, a control means secured to said upstream directionality control device and a ball and socket device for mounting said control shaft to said outlet bell, the improvement comprising said upstream shutoff valve including a flow straightener assembly rendered functional when said shutoff valve is in a fully opened position and non-functional when said shutoff valve is in a closed position.

4. The air outlet defined in claim 3 wherein said shutoff valve is mounted on a rotary shaft in said air outlet, and wherein said flow straightener is mounted on said rotary shaft with said shutoff valve and is operated commonly on an operation of said rotary shaft.

5. In a vehicle air outlet having an outlet bell, an upstream shutoff valve having an open and closed position, an upstream intruder member which is downstream of said shutoff valve, a control shaft secured to said upstream intruder member and a ball and socket device for mounting said control shaft to said outlet bell, the improvement comprising said upstream shutoff valve including a flow straightener assembly rendered functional when said shutoff valve is in a fully opened position and non-functional when said shutoff valve is in a closed position.

6. The air outlet defined in claim 5 wherein said shutoff valve is mounted on a rotary shaft in said air outlet, and wherein said flow straightener is mounted on said rotary shaft with said shutoff valve and is operated commonly on an operation of said rotary shaft.

* * * * *